United States Patent Office 3,491,155
Patented Jan. 20, 1970

3,491,155
2 - HYDROXY - 3,5 - DIHYDROCARBYLBENZYL-
3,5 - DIHYDROCARBYL - 4 - HYDROXYPHENYL
SULFIDES
Francis X. O'Shea, Naugatuck, Conn., assignor to Uniroyal, Inc., New York, N.Y., a corporation of New Jersey
No Drawing. Filed Nov. 30, 1966, Ser. No. 597,841
Int. Cl. C07c 149/00
U.S. Cl. 260—609                              7 Claims

ABSTRACT OF THE DISCLOSURE

This invention relates to the compounds, 2-hydroxy-3,5-dihydrocarbylbenzyl 3,5 - dihydrocarbyl -4 - hydroxyphenyl sulfide and their method of preparation. This new series of compounds are effective antioxidants for various organic materials.

---

The compounds of my invention display excellent antioxidant activity when utilized to prevent oxidative deterioration in various organic materials, e.g. rubber, plastic, fats and petroleum products.

The compounds may be represented by the following formula:

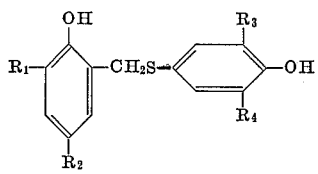

wherein $R_1$, $R_2$, $R_3$ and $R_4$ may be alkyl groups of 1 to 12 carbon atoms each, cycloalkyl groups of 6 to 8 carbon atoms each or aralkyl groups of 7 to 9 carbon atoms each. $R_4$ may also be hydrogen.

My invention is also concerned with the novel method of preparing the aforementioned compounds. This method involves the reaction of (A) a compound of the general formula:

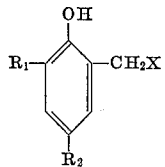

in which $R_1$ and $R_2$ are as previously described and the group X may be selected from the group consisting of:

(a) A benzothiazolyl radical,

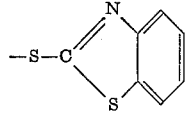

and (b) A group of the formula:

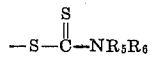

in which $R_5$ and $R_6$ are lower alkyl groups with (B) a mercaptophenol of the formula:

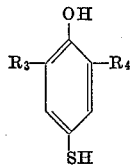

in which $R_3$ and $R_4$ are as previously described under alkaline conditions according to the following equation:

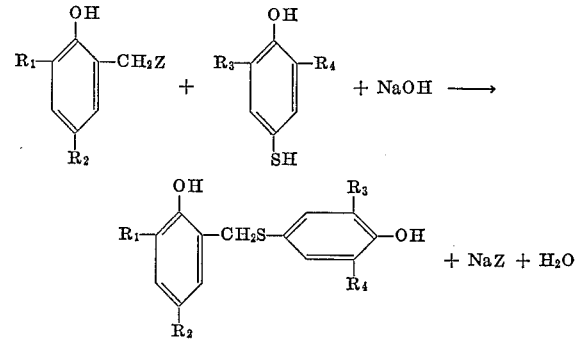

In U.S. Patent 3,179,701 issued on Apr. 20, 1965, to A. L. Rocklin, antioxidant compounds of the following formula were disclosed:

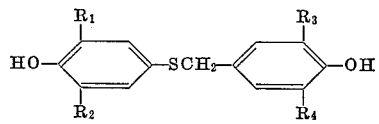

wherein $R_1$, $R_2$, $R_3$ and $R_4$ are alkyl groups of 1 to 8 carbon atoms.

Although my compounds may generally be described as isomers of the compounds described by Rocklin, varying in the hydroxyl function on the benzyl portion of the molecule, i.e. the hydroxyl is ortho to the methylene group rather than para, it is observed that the structural difference provides both unexpected and important advantages over the prior art compounds. Specifically, my compounds provide superior non-discoloring properties while maintaining high activity, which will be evidenced by the examples stated below. It will also be noted that the method of preparation taught by Rocklin is clearly distinguished from my novel process.

In accordance with the invention, 2-hydroxy-3,5-dihydrocarbylbenzyl, 3,5-dihydrocarbyl - 4 - hydroxyphenyl sulfides may be prepared by reacting 1 molar equivalent of the compound designated as A above with 1 molar equivalent of a mercaptophenol of the type designated as B above and 1 molar equivalent of an alkali metal hydroxide. Any alkali metal hydroxide may be used, sodium hydroxide being preferred.

The reaction may be carried out in a suitable water-miscible solvent such as methanol, ethanol, isopropanol, dioxane, ethylene glycol dimethyl ether, etc. at a temperature from about room temperature to about 100° C.

Preferred solvents for the reaction are methanol, ethanol and isopropanol. The preferred temperature is in the range of 50° C. to 100° C., the reaction ordinarily being carried out at or near the reflux temperature of the solution. The preferred time of the reaction is up to four hours, although longer times may be used but are not necessary, the reaction generally being complete in 30 minutes or less.

The reaction may also be carried out in a two-phase system such as benzene-water or xylene-water using vigorous agitation. Although longer reaction times are generally employed than in homogeneous solution, this heterogeneous system has the advantage of providing a simplified recovery procedure. In such a two-phase system, the product is soluble in the organic phase which can be readily separated from the aqueous phase containing the alkali metal dialkyldithiocarbamate or the alkali metal salt of 2-mercaptobenzothiazole. The product is then obtained by removing the solvent from the organic phase.

The intermediate 2-hydroxy-3,5-dihydrocarbylbenzyl benzothiazolyl sulfides are prepared by reacting one molar equivalent of a 2,4-dihydrocarbylphenol of the general formula:

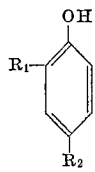

in which $R_1$ and $R_2$ are as previously described with one molar equivalent of formaldehyde and one molar equivalent of 2-mercaptobenzothiazole under acid conditions in a reaction similar to that described by Sebrell in U.S. Patents 2,134,957 Nov. 1, 1938 and 2,150,463 Apr. 14, 1939.

The 2,4-dihydrocarbylphenols which may be used in the preparation of the intermediate include:

2,4-dimethylphenol
2-methyl-4-t-butylphenol
2-t-butyl-4-methylphenol
2,4-di-t-butylphenol
2-methyl-4-cyclohexylphenol
2-cyclohexyl-4-methylphenol
2,4-dicyclohexylphenol
2-methyl-4-cyclooctylphenol
2-cyclooctyl-4-methylphenol
2,4-dicyclooctylphenol
2-methyl-4-t-octylphenol
2-t-octyl-4-methylphenol
2,4-di-t-octylphenol
2-nonyl-4-methylphenol
2,4-dinonylphenol
2-dodecyl-4-methylphenol
2,4-didodecylphenol
2-(alpha-methylbenzyl)-4-methylphenol
2,4-di(alpha-methylbenzyl)phenol
2-(alpha,alpha-dimethylbenzyl)-4-methylphenol
2,4-di(alpha,alpha-dimethylbenzyl)phenol etc.

The intermediate 2-hydroxy-3,5-dihydrocarbylbenzyl N,N-dialkyldithiocarbamates are prepared by reacting a compound of the formula:

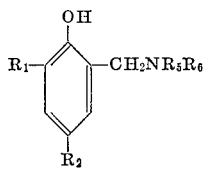

with carbon disulfide as described in U.S. Patent 3,219,700, issued Nov. 23, 1965.

The mercaptophenols which may be used include:

2,6-dimethyl-4-mercaptophenol
2,6-diisopropyl-4-mercaptophenol
2-methyl-4-mercapto-6-t-butylphenol
2,6-di-sec-butyl-4-mercaptophenol
2,6-di-t-butyl-4-mercaptophenol
2-methyl-4-mercapto-6-t-octylphenol
2-methyl-4-mercapto-6-cyclohexylphenol
2,6-dicyclooctyl-4-mercaptophenol
2,6-di(alpha-methylundecyl)-4-mercaptophenol
2-methyl-4-mercapto-6-(alpha-methylbenzyl)phenol
2-methyl-4-mercapto-6-(alpha,alpha-dimethylbenzyl)-phenol
2-methyl-4-mercaptophenol
2-isopropyl-4-mercaptophenol
2-t-butyl-4-mercaptophenol
2-(alpha-methylundecyl)-4-mercaptophenol
2-cyclooctyl-4-mercaptophenol and
2-(alpha-methylbenzyl)-4-mercaptophenol To illustrate the novel compounds and their methods of preparation, the following examples are set forth. It should be understood, however, that these examples are merely illustrative and are not to be regarded as limitations since the basic teachings thereof may be varied at will, as will be understood by one skilled in the art.

EXAMPLE 1

The preparation of 2-hydroxy-3-t-butyl-5-methyl-benzyl 3,5-diisopropyl-4-hydroxyphenol sulfide To a solution of 21 g. (0.1 mole) of 2,6-diisopropyl-4-mercaptophenol and 8 g. (0.1 mole) of 50% aqueous sodium hydroxide in 150 ml. of ethanol was added 34.3 g. of 2-hydroxy-3-t-butyl-5-methylbenzyl 2-benzothiazolyl sulfide. The reaction mixture was refluxed gently for 20 minutes, cooled and poured into cold water. The product which separated was extracted with ether, dried with anhydrous sodium sulfate and evaporated down to a crystalline residue. The crystalline mass was broken up and washed with hexane yielding 32 g. (83%) of 2-hydroxy-3-t-butyl-5-methylbenzyl 3,5-diisopropyl-4-hydroxyphenyl sulfide, M.P. 84–87°. Recrystallization from hexane raised the melting point to 88–89°.

*Analysis.*—Calc'd for $C_{24}H_{34}O_2S$: C, 74.61%; H, 8.81%; S, 8.29%. Found: C, 74.56%; H, 9.02%; S, 8.08%.

EXAMPLE 2

The preparation of 2-hydroxy-3-(α-methylbenzyl)-5-methylbenzyl 3-methyl-4-hydroxy-5-t-butylphenyl sulfide.

2-methyl-4-mercapto-6-t-butylphenol was reacted with 2-hydroxy-3-(α-methylbenzyl)-5-methylbenzyl N,N-dimethyldithiocarbamate in the manner described in example 1 to yield 2-hydroxy-3-(α-methylbenzyl)-5-methylbenzyl 3-methyl-4-hydroxy-5-t-butylphenyl sulfide, M.P. 94–95° after recrystallization from hexane.

*Analysis.*—Calc'd for $C_{27}H_{32}O_2S$: C, 77.14%; H, 7.61%; S, 7.61%. Found: C, 76.88%; H, 7.81%; S, 7.82%.

EXAMPLE 3

The preparation of 2-hydroxy-3-methyl-5-t-butylbenzyl 3-methyl-4-hydroxy-5-t-butylphenyl sulfide 2-methyl-4-mercapto-6-t-butylphenol was reacted with 2-hydroxy-3-methyl-5-t-butylbenzyl N,N-dimethyldithiocarbamate in the manner described in Example 1 to yield 2-hydroxy-3-methyl-5-t-butylbenzyl 3-methyl-4-hydroxy-5-t-butylphenyl sulfide, a very viscous oil.

*Analysis.*—Calc'd for $C_{23}H_{32}O_2S$: C, 74.20%; H, 8.60%; S, 8.60%. Found: C, 74.39%; H, 8.67%; S, 8.39%.

EXAMPLE 4

The preparation of 2-hydroxy-3-t-butyl-5-methylbenzyl 3-methyl-4-hydroxy-5-t-butylphenyl sulfide 2-methyl-4-mercapto-6-t-butylphenol was reacted with 2-hydroxy-3-t-butyl-5-methylbenzyl 2-benzothiazolyl sulfide in the manner described in Example 1 to yield 2-hydroxy-3-t-butyl-5-methylbenzyl 3-methyl-4-hydroxy-5-t-butylphenyl sulfide which was recrystallized from hexane, M.P. 93–95°, yield=70%.

*Analysis.*—Calc'd for $C_{23}H_{32}O_2S$: C, 74.20%; H, 8.60%; S, 8.60%. Found: C, 74.14%; H, 8.84%; S, 8.64%.

EXAMPLE 5

The preparation of 2-hydroxy-3-(1,1,3,3-tetramethylbutyl)-5-methylbenzyl 3-methyl-4-hydroxy-5-t-butylphenyl sulfide 2-methyl-4-mercapto-6-t-butylphenol was reacted with 2-hydroxy-3-(1,1,3,3-tetramethylbutyl)-5-methylbenzyl 2-benzothiazolyl sulfide in the manner described in Example 1 to yield 2-hydroxy-3-(1,1,3,3-tetramethylbutyl)-5-methylbenzyl 3-methyl-4-hydroxy-5-t-butylphenyl sulfide as a viscous oil.

EXAMPLE 6

The preparation of 2-hydroxy-3-t-butyl-5-methylbenzyl 3-methyl-4-hydroxy-5-t-butylphenyl sulfide in a two phase system In a 500 ml. 3-neck Morton flask was placed 19.6 g. (0.1 mole) of 2-methyl-4-mercapto-6-t-butylphenol, 34.3 g. (0.1 mole) of 2-hydroxy-3-t-butyl-5-methylbenzyl 2-benzothiazolyl sulfide, 8.8 g. (0.11 mole) of 50% aqueous sodium hydroxide, 100 ml. of water and 100 ml. of benzene. The solution was stirred and heated at 70° C. for four hours. The mixture was then cooled and the benzene layer was separated. It was washed with water, dried with anhydrous sodium sulfate and evaporated down to a solid residue. The product was recrystallized from hexane to yield 31 g. (83%) of 2-hydroxy-3-t-butyl-5-methylbenzyl 3-methyl-4-hydroxy-5-t-butylphenyl sulfide, M.P. 92–95°.

EXAMPLE 7

The preparation of 2-hydroxy-3-t-butyl-5-methylbenzyl 3-methyl-4-hydroxyphenyl sulfide 2-methyl-4-mercaptophenol was reacted with 2-hydroxy-3-t-butyl-5-methylbenzyl 2-benzothiazolyl sulfide in the manner described in Example 1 to yield 2-hydroxy-3-t-butyl-5-methylbenzyl 3-methyl-4-hydroxyphenyl sulfide as a viscous oil.

EXAMPLE 8

This example demonstrates the usefulness of a compound of this invention as an antioxidant for natural rubber.

A natural rubber composition was prepared in accordance with the following recipe:

Masterbatch #1:
| | |
|---|---|
| Pale crepe | 98.65 |
| Zinc oxide | 10.00 |
| Lithopone | 60.00 |
| Finely divided CaCO$_3$ (whiting) | 60.00 |
| Zinc laurate (Laurex) | 0.50 |
| Sulfur | 3.00 |
| Masterbatch #2 | 1.50 |
| | 233.65 |

Masterbatch #2:
| | |
|---|---|
| Pale crepe | 90.0 |
| Tetramethyl thiuram monosulfide (Monex) | 10.0 |
| | 100.0 |

The antioxidants (1 part) were then milled into 233.65 parts of masterbatch #1 and samples were cured at 274° F. for 20 minutes. Tensile bars were aged in an oxygen bomb for 48 hours at 70° C. The percent retention of tensile strength after aging demonstrates the activity of the compounds as rubber antioxidants.

| Compound: | Percent tensile retained |
|---|---|
| (1) None | 59 |
| (2) 3 - methyl-4-hydroxy-5-t-butylbenzyl 3-methyl-4-hydroxy-5-t-butylphenyl sulfide | 73 |
| (3) 2,2' - methylenebis(4-methyl-6-t-butylphenol) | 84 |
| (4) 2 - hydroxy-3-(1,1,3,3-tetramethylbutyl)-5-methylbenzyl 3-methyl-4-hydroxy-5-t-butylphenyl sulfide | 90 |

The results demonstrate the effectiveness of a compound of this invention (4) as an antioxidant and shows its advantage over a compound of the prior art (2) and a commercial bis-phenolic antioxidant (3).

The cured stocks were examined for discoloration and staining. In the results described below the rating is on a scale of 1=very light to 10=very dark where O represents no discoloration, y=yellow and t=tan.

| Aging conditions | Compound (2) | (3) | (4) |
|---|---|---|---|
| 15' NO$_2$ fumes | 4 y | 3 t | 3 y. |
| 2 weeks on roof | 3 y | 1 y | 1 y. |
| 61 X Lacquer stain 8 hrs. sunlamp | Off-white | Off-white | 0. |
| 61 K Lacquer stain 8 hrs. sunlamp | do | do | 0. |

These results demonstrate the advantage of a compound of this invention (4) in commercially important nondiscoloring properties over a compound of the prior art (2).

EXAMPLE 9

This example demonstrates the usefulness of compounds of this invention as stabilizers for polyisoprene.

A commercial cis-polyisoprene synthetic rubber containing 2,6-di-t-butyl-p-cresol as a stabilizer was used as the base polymer. The polymer was dissolved in benzene so as to provide a 2% polymer solution. An aliquot portion of a benzene solution of the compound to be evaluated was added so as to provide 1% by weight of the additive based upon the weight of polymer in the solution. A thin film of rubber was then deposited on a sodium chloride disk by evaporating 10 drops of the solution on the one-inch diameter disk.

The disks were then placed in a 130° oven and removed after 30 minutes, one hour and every hour thereafter. At each interval, the infrared spectrum of the polymer film was obtained. Oxidation of the polymer film is evidenced by the appearance of a band at 5.85μ in the spectrum caused by the development of carbonyl groups in the polymer. The time of aging required for the appearance of this band in the spectrum is taken as the break time. The effectiveness of compounds as stabilizers can be evaluated by the length of time they protect the rubber against oxidation as determined by this carbonyl development test.

The use of infrared spectrophotometry in following the oxidation of polymer films has been described by Bishop [Anal. Chem., 33, 456 (1961)].

| Added stabilizer: | Hours to break |
|---|---|
| (1) None | ½ |
| (2) 3 - methyl -4 - hydroxy - 5- t - butylbenzyl 3 - methyl - 4 - hydroxy - 5 - t - butyl -phenyl sulfide | 4 |
| (3) 2 - hydroxy - 3 - t - butyl - 5 - methylbenzyl 3 - methyl - 4 - hydroxy - 5 - t - butylphenyl sulfide | 5 |

Non-discoloring characteristics were determined in this polymer by aging five grams of rubber obtained from the above described polymer solutions at 130° C. for one hour and observing for color formation.

| Added stabilizer: | Color |
|---|---|
| (1) 3 - methyl - 4 - hydroxy - 5 -t-butylbenzyl 3 - methyl - 4 - hydroxy - 5-t-butylphenyl sulfide | Yellow. |
| (2) 2 - hydroxy - 3 - t-butyl-5-methylbenzyl 3 - methyl - 4 - hydroxy-5-t-butylphenyl sulfide | Colorless. |

The same type of evaluation was carried out on another set of compounds with the following results:

| Added Stabilizer | Hours to break | Color |
|---|---|---|
| (1) 3,5-diisopropyl-4-hydroxy-benzyl 3-methyl-4-hydroxy-5 t-butylphenyl sulfide. | 3 | Yellow. |
| (2) 2-hydroxy-3-t-butyl-5-methyl-benzyl 3,5-diisopropyl-4-hydroxyphenyl sulfide. | 3 | Colorless. |

These results show the significant advantage in non-discoloring properties of the compounds of this invention over the prior art compounds without loss in antioxidant activity.

I claim:
1. A chemical of the formula:

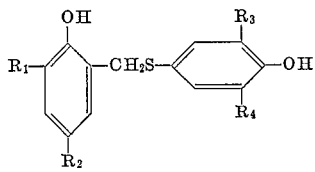

wherein $R_1$, $R_2$, and $R_3$ are selected from the group consisting of alkyl groups of 1 to 12 carbon atoms, cycloalkyl groups of 6 to 8 carbon atoms and aralkyl groups of 7 to 9 carbon atoms, and wherein $R_4$ is selected from the group consisting of alkyl groups of 1 to 12 carbon atoms, cycloalkyl groups of 6 to 8 carbon atoms, an aralkyl group of 7 to 9 carbon atoms, and hydrogen.

2. 2 - hydroxy - 3 - t - butyl - 5 - methylbenzyl 3,5-diisopropyl-4-hydroxyphenyl sulfide.

3. 2 - hydroxy - 3 - (α - methylbenzyl) - 5 - methylbenzyl 3-methyl-4-hydroxy-5-t-butylphenyl sulfide.

4. 2 - hydroxy - 3 - methyl - 5 - t - butylbenzyl 3-methyl-4-hydroxy-5-t-butylphenyl sulfide.

5. 2 - hydroxy - 3 - t - butyl - 5 - methylbenzyl 3-methyl-4-hydroxy-5-t-butylphenyl sulfide.

6. 2 - hydroxy - 3 - (1,1,3,3-tetramethylbutyl) - 5-methylbenzyl 3-methyl-4-hydroxy-5-t-butylphenyl sulfide.

7. 2 - hydroxy - 3 - t - butyl - 5 - methylbenzyl 3-methyl-4-hydroxyphenyl sulfide.

References Cited
UNITED STATES PATENTS

| | | | |
|---|---|---|---|
| 3,179,701 | 4/1965 | Rocklin | 260—609 |
| 3,260,757 | 7/1966 | O'Shea | 260—609 |
| 3,260,758 | 7/1966 | O'Shea et al. | 260—609 |

CHARLES B. PARKER, Primary Examiner

D. R. PHILLIPS, Assistant Examiner

U.S. Cl. X.R.

252—404, 48.2; 260—45.95, 814, 398.5, 304, 455